United States Patent [19]

Duclos et al.

[11] Patent Number: 4,720,087
[45] Date of Patent: Jan. 19, 1988

[54] INERTIA TYPE FLUID MOUNT USING ELECTRORHEOLOGICAL AND OTHER FLUID

[75] Inventors: Theodore G. Duclos, Raleigh; Douglas A. Hodgson; J. David Carlson, both of Cary, all of N.C.

[73] Assignee: Lord Corporation, Erie, Pa.

[21] Appl. No.: 904,627

[22] Filed: Sep. 5, 1986

[51] Int. Cl.⁴ .............................................. F16F 6/00
[52] U.S. Cl. .................................. 267/140.1; 188/267
[58] Field of Search ............... 248/550, 562; 267/8 R, 267/140.1, 140.3, 151; 188/267

[56] References Cited

U.S. PATENT DOCUMENTS

| | | | |
|---|---|---|---|
| 2,661,596 | 12/1953 | Winslow . | |
| 2,846,028 | 8/1958 | Gunther | 188/267 |
| 2,973,969 | 3/1961 | Thall | 188/267 X |
| 3,207,269 | 9/1965 | Klass . | |
| 4,262,886 | 4/1981 | Salver et al. | 267/8 R |
| 4,458,888 | 7/1984 | Wolf et al. | 267/140.1 |
| 4,583,723 | 4/1986 | Ozawa | 188/267 X |

FOREIGN PATENT DOCUMENTS

| | | | |
|---|---|---|---|
| 3336965 | 5/1985 | Fed. Rep. of Germany . | |
| 129944 | 8/1982 | Japan . | |
| 0113644 | 7/1983 | Japan | 267/140.1 |
| 113832 | 6/1985 | Japan . | |
| 113833 | 6/1985 | Japan . | |
| 1259802 | 1/1972 | United Kingdom . | |
| 2111171 | 6/1983 | United Kingdom . | |
| 1021835 | 6/1983 | U.S.S.R. | 188/267 |

Primary Examiner—Duane A. Reger
Attorney, Agent, or Firm—Bell, Seltzer, Park & Gibson

[57] ABSTRACT

The mount includes first and second chambers containing water, glycol or similar conventional hydraulic fluid of low viscosity, and at least a third chamber containing electrorheological fluid that is used to "tune" the frequencies at which the mount experiences abrupt reduction of dynamic stiffness. The third chamber is contiguous with one of the first and second chambers, and with one end of an inertia track passageway whose opposite end is contiguous with the other of the first and second chambers. Energization of an electrode-type of valve associated with the third chamber produces a high voltage electrical field and fluid solidification within the third chamber. Pressure pulses are transmitted through the third chamber only when the valve is de-energized. The valve has electrode elements which may be of flat or spiral shape. The mount may include additional valved chambers, and additional passageways which preferably are of differing sizes.

20 Claims, 5 Drawing Figures

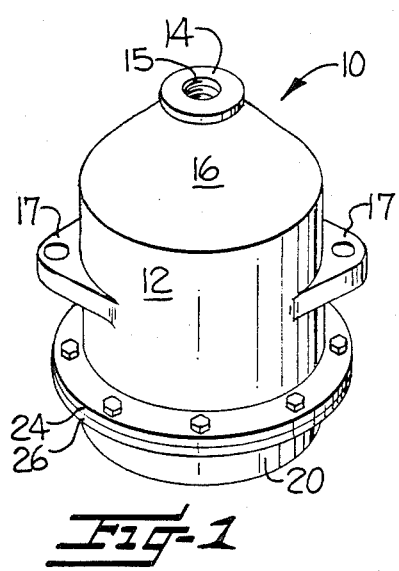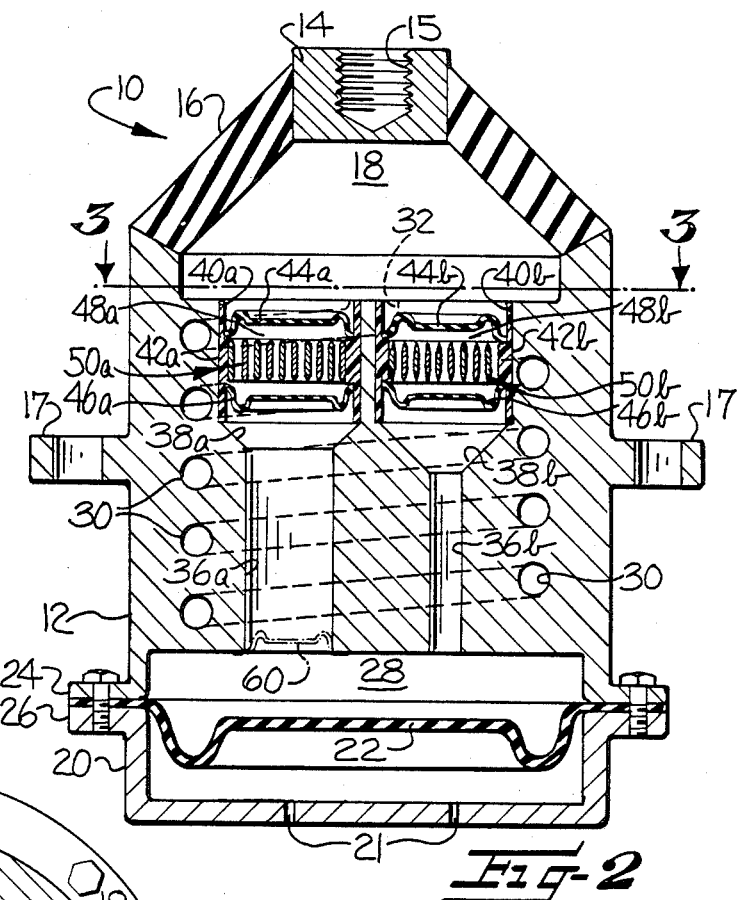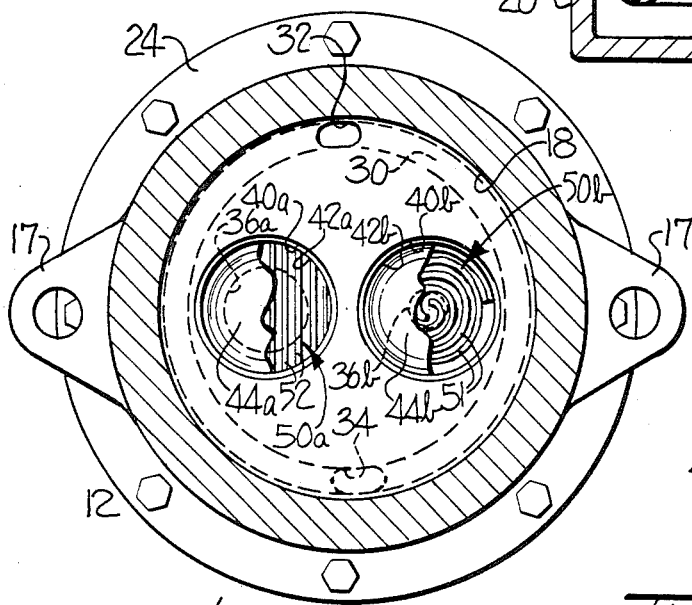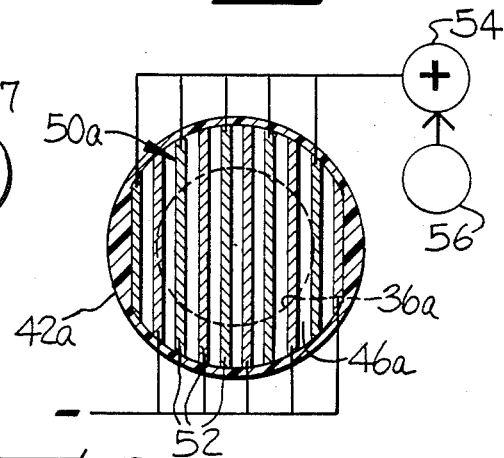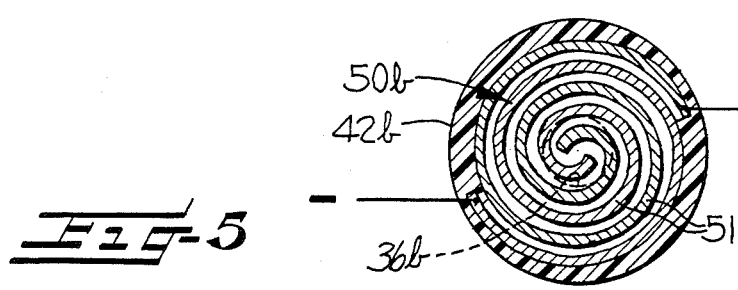

INERTIA TYPE FLUID MOUNT USING ELECTRORHEOLOGICAL AND OTHER FLUID

This invention relates to vibration attenuating fluid mounts and similar devices that generate fluid inertia forces effecting abrupt changes in the mount operating characteristics at certain excitation frequencies. The invention more specifically relates to an improved inertia type mount containing electrorheological fluid by means of which the mount may be dynamically tuned so as to cause the abrupt changes in its operating characteristics to occur at selected frequencies.

BACKGROUND OF THE INVENTION

Fluid mounts of the "hydraulic damper" type have long been used in vehicular and other applications to dampen shocks and/or vibrations. A typical hydraulic damper has interconnected variable volume chambers between which hydraulic fluid passes during excitation of the mount. Resistance of the fluid to flow between the chambers opposes and damps vibratory and similar forces imposed upon the mount. The viscous damping forces generated by the mount are proportional to, among other things, the viscosity of the hydraulic fluid and the extent to which its flow between the chambers is "throttled" or otherwise impeded by the orifice or conduit through which the fluid passes. The use of hydraulic fluids of relatively high viscosity is therefore acceptable and desirable in many viscous fluid dampers.

A newer type of fluid mount, which has received increasing acceptance within recent years, utilizes fluid inertia forces to achieve and/or to enhance the desired attenuation of vibratory forces. A plot of the dynamic stiffness against the excitation frequency of mounts of the fluid inertia type typically includes a notch-like region, at which the dynamic stiffness of the mount is greatly reduced and may be considerably less than its static stiffness, followed by a "peak" of large dynamic stiffness. A mount may be so designed as to cause the foregoing abrupt variations in its dynamic stiffness to occur at a particular excitation frequency where a specific vibration problem exists. For example, objectional "drone" noise occurring within some automobiles as a result of transmission to their frames of engine firing vibrations generated at a particular engine speed, may be substantially eliminated by the use of an inertia type engine mount that is specifically designed so as to possess its minimum-stiffness "notch" at the frequency of the aforesaid vibrations.

While static mount tuning is satisfactory for the attenuation of troublesome vibrations occurring at only one particular frequency, problem vibrations such as those producing vehicle "drone" noise may occur at a number of significantly differing engine speeds and/or mount excitation frequencies. In such a situation it is highly desirable for a mount to be dynamically tunable so as to permit selective variation during mount operation of the frequencies at which the mount has very low dynamic stiffness. Since the frequency at which stiffness reduction occurs is a function of, among other things, the size of the fluid flow path between the variable volume chambers of a mount, one theoretically possible way of dynamically tuning the mount is by varying the flow path cross-sectional area. In a mount containing a plurality of flow passageways between the chambers, this result should be realizable by selective opening and closing of valve means associated with one or more of the passageways. However, the expense, size and/or relative slowness of operation of conventional mechanically or electromechanically actuated valves makes their use less than satisfactory for the foregoing purpose.

A possible alternative to the use of conventional valves and conventional hydraulic fluids, such as glycol and/or water, is the use of "valves" that generate high voltage electrical fields and of an electrorheological fluid whose apparent viscosity greatly increases in the presence of such electrical fields. Of the two types of fluid mounts, those of the viscous damping type are more naturally suited for the use of electrorheological fluids. The desired generation of viscous damping forces by such mounts tends to be enhanced by the use of such fluids since their viscosity is relatively high even in the absence of an applied electrical field. The viscous damping forces generated by the mount are also enhanced by the "throttling" of the fluid by the relatively closely spaced valve electrodes between which the fluid passes and an electrical field is generated. In an inertia type fluid mount, on the other hand, the aforesaid flow impeding effects oppose generation of the desired fluid inertia forces and the resulting abrupt changes in mount stiffness at certain frequencies. The situation is further aggravated by the fact that the flow resistance produced by the field generating electrodes between which the fluid passes is inversely proportional to the cube of the spacing or "gap" distance between such electrodes. This is significant since such spacing, along with other factors such as the magnitude of the applied voltage, determines the applied stress that the field-actuated fluid can withstand without undergoing shear. The electrode valve in an inertia type mount normally would be required to produce a higher yield point stress in the electrorheological fluid than would the valve in a viscous damper, since in the inertia type mount flow through the valve is to be entirely stopped, whereas in the viscous damper total cessation of the flow would rarely if ever be necessary or desirable.

DESCRIPTION OF THE PRIOR ART

The patent applications of Japanese Publication Nos. 60-113832A and 60-113833A disclose fluid mounts having variable volume chambers interconnected by a plurality of passageways, at least one of which is closeable during mount operation by an associated valve member.

The German published patent application of Offenlegungsschrift DE 3336965A1 discloses a fluid mount containing electrorheological fluid whose flow through a passageway, interconnecting variable volume chambers of the mount, is controlled by an electrical field generated across such passageway between electrode plates that extend along substantially its entire length.

Japanese patent application publication No. 57-129944 discloses a fluid mount containing magnetic fluid whose flow between the mount chambers and through an interconnecting small hole is controlled by a magnetic field generated in the vicinity of such hole. In one embodiment the mount also contains nonmagnetic fluid, such as water or oil, which is separated from the magnetic fluid by a single rubber plate.

SUMMARY OF THE INVENTION

The inertia type fluid mount of the present invention realizes the benefits resulting from use of electrorheological fluid and associated field producing valve means, while minimizing the undesirable flow retardation tending to result from the greater zero-voltage viscosity of the electrorheological fluid and from the throttling of such fluid by the relatively closely spaced electrode elements of the field producing valve means. The mount of the present invention includes first, second and third discrete variable volume chambers, the first and third ones of which are contiguous with each other. A first passageway extends between and preferably communicates with the first and second chambers. A second passageway has one end contiguous with the third chamber, but not in communication therewith, and an opposite end contiguous and preferably communicating with the second chamber. The third chamber contains electrorheological fluid and valve electrodes for, when energized, generating a high voltage field effecting solidification of the electrorheological fluid therebetween. The other two mount chambers and the first mount passageway may and preferably do contain a different type of fluid, such as water and/or glycol, having a much lower viscosity.

In a preferred embodiment the mount further includes at least one additional chamber and associated passageway, the additional chamber containing electrorheological fluid and field producing valve means energizable independently of, although at times in unison with, the valve means within the previously discussed third mount chamber. The electrode members of each valve means define a plurality of parallel flow paths through the valve means, and preferably are so constructed as to minimize the presence of localized charge concentrations and their resistance to fluid flow. In one embodiment the electrodes are substantially flat, while in another embodiment they are of spiral shape. The flow area of each valve means is preferably greater than the flow area of the passageway associated therewith. At the end thereof contiguous with one of the valve containing chambers, each passageway preferably has a transition section of varying cross-sectional area.

DESCRIPTION OF THE DRAWINGS

Other features of the invention will be apparent from the following description of an illustrative embodiment thereof, which should be read in conjunction with the accompanying drawing, in which:

FIG. 1 is a perspective view of a mount in accordance with the invention;

FIG. 2 is an enlarged vertical section through the mount of FIG. 1;

FIG. 3 is a horizontal section taken approximately along the line 3—3 of FIG. 2, some components being shown in top plan and partially broken away to reveal details of interior construction; and FIGS. 4 and 5 are enlarged horizontal sections through the field producing valve means of the mount, associated control circuitry and components also being schematically shown.

DESCRIPTION OF THE PREFERRED EMBODIMENT

The number 10 in FIGS. 1 and 2 designates a fluid mount or similar device of the type adapted to generate fluid inertia forces and to attenuate the transmission of vibratory and similar forces between relatively movable vibration transmitting and receiving members (not shown), such as the engine and frame components of an automobile or other vehicle. The housing of mount 10 includes a rigid central element 12 and a rigid upper element 14 interconnected for vertical movement relative to each other by a resilient spring-like elastomeric element 16 of generally fusto-conical shape. Housing section 12 is adapted to be fixedly connected, as by means of its illustrated brackets 17, to one of the two members (not shown) interconnected by the mount. Upper housing element 14 is similarly adapted to be connected, as by use of the threaded bore 15 therein, to the other of such members. In conjunction with others subsequently described, the foregoing housing components define a variable volume fluid chamber 18, the capacity of which is decreased and increased by relative movement of housing elements 12, 14 toward and away from each other, respectively. Adjacent its lower end, the housing of mount 10 includes a rigid end cap element 20 having one or more vent openings 21 therein, and further includes a resilient and flexible rolling diaphragm element 22 made of elastomer or similar material. The periphery of diaphragm 22 is clamped in a fluid tight manner between bolted together peripheral flanges 24, 26 respectively provided upon housing elements 12, 20. The space between diaphragm 22 and the overlying surfaces of central housing element 12 defines a second variable volume fluid chamber 28 that is interconnected with the first or upper chamber 18 by an elongate helical inertia track passageway 30 provided within central housing section 12 and having opposite upper and lower ends 32, 34 respectively communicating with chambers 18, 28.

Central housing section 12 also includes two additional inertia track passageways 36a, 36b that extend in generally parallel relationship to the central and illustratively vertical axis of mount 10. Each passageway 36 is of substantially circular cross-sectional shape, has a length considerably greater than its diameter, and has a lower end opening from central housing section 12 into lower chamber 28 of mount 10. The diameters of the passageways preferably and illustratively differ from each other. Adjacent their upper ends, passageways 36a, 36b respectively have transition sections 38a, 38b that communicate with valve-containing cavities 40a, 40b opening from the upper major surface of central housing section 12. The diameter of each cavity 40 is considerably greater than the diameter of the main part of the passageway 36 in series therewith. The diameter of each transition section 38 varies along its length to provide smooth transition flow between the valve cavity 40 and the main part of the inertia track passageway 36 with which it is associated.

Annular bodies 42a, 42b, formed of electrically-insulating plastic or similar material, are press-fitted or otherwise fixedly secured within respective ones of the cavities 40a, 40b. Vertically spaced upper and lower rolling diaphragms 44a, 44b and 46a, 46b have their peripheral edges sealingly secured to respective ones of the bodies 42a, 42b, and define therewith additional variable volume fluid chambers 48a, 48b of mount 10. Since upper diaphragm 44a constitutes a common boundary between mount chambers 18, 48a, such chambers are contiguous with each other. Chambers 18 and 48b are similarly contiguous by reason of diaphragm 44b being a common boundary therebetween. Adjacent their lower ends, chambers 48a, 48b are contiguous with the transition sections 38a, 38b of passageways 36a, 36b, respectively.

Chambers 48a, 48b each contain electrorheological fluid and suitable electrode-type valve means for, when energized, generating an electric field effecting large increase in viscosity and substantial solidification of such fluid. As is known to those skilled in the art, electrorheological fluids customarily are comprised of solid hydrophilic particles suspended within hydrophobic liquids. While other compositions might also be satisfactory, a preferred one consists of a mixture or slurry of precipitated silica particles suspended within silicone oil and a surfactant such as glycerol monooleate, which composition has in its unactivated state (i.e. when not exposed to an electrical field), a viscosity of approximately 30 centipoise. While the aforesaid viscosity is low in relation to that of other electrorheological fluid compositions, it is still some thirty times greater than the viscosity of the water and/or glycol fluids customarily employed in inertia-type fluid mounts. To minimize the drag effect of the greater viscosity electrorheological fluid upon the desired generation of high magnitude inertia forces, such fluid preferably is employed only in valved chambers 48a, 48b, and other "conventional" non-electrorheological fluid, such as water and/or glycol, of low viscosity is used within the remaining chambers and the passageways of mount 10.

The electrorheological fluid within the central portions of chambers 48a, 48b is activated at desired times by field-producing valve means 50a, 50b disposed within respective ones of the chambers. Valve 50a includes a plurality of substantially flat electrode plates 52 extending in laterally spaced substantially parallel relationship to each other and to the central vertical axis of mount 10. The opposite ends of electrode plates 52, and the outer surfaces of the outermost two of them, are bonded or otherwise fixedly secured to annular body 42a. The spaces or gaps between electrodes 52 define a plurality (illustratively nine) of vertical parallel flow paths through valve 50a. The combined cross sectional area of such flow paths preferably is significantly greater than the cross sectional area of the main part of the inertia track passageway 36a underlying valve 50a. The upper and lower edges of electrodes 52 are rounded so as to facilitate free vertical flow between the electrodes of the electrorheological fluid within chamber 48a, when such fluid is in its unactivated state. As is schematically indicated in FIG. 4, alternate ones of electrodes 52 are electrically grounded. The remaining electrodes 52 are connected to a high voltage switching device 54 that, in response to command signals transmitted to it from a suitable controller 56, places such electrodes under a high (e.g. 6000 volts) electrical voltage producing an electrical field between adjacent one of the electrodes. The intensity of the field, which is a function of the applied voltage and of the spacing of electrodes 52 relative to each other, is such as to effect substantially instantaneous solidification or gelling of the electrorheological fluid between the electrodes. This prevents flow of the fluid within chamber 48a, which in turn prevents transmission of pressure pulses through the chamber. Upon cessation of the applied voltage, in response to a command from controller 56, the fluid promptly returns to its unactivated "flowable" state.

The other valve means 50b of mount 10 operates in the same manner as valve 50a, and may be of identical construction. Illustratively, however, valve 50b is comprised of two spirally shaped electrode plates 51 extending in interdigitated and laterally spaced relationship to each other so as to define therebetween an elongated path for vertical flow of the electrorheological fluid, when in its unactivated state, within chamber 48b. The outer end portions of electrodes 58 are bonded or otherwise fixedly secured to and supported by annular body 42b of chamber 48b. The cross-sectional area of the flow path through valve 50b is preferable significantly greater than the cross-sectional area of the underlying inertia track passageway 36b. The upper and lower edges of spiral electrodes 58 preferably are rounded so as to provide minimum flow resistance. One of the electrodes 58 is electrically grounded, while the other is connected to a high voltage switching device 54' under the command of a controller 56'. The foregoing components are similar to and may be the same as the switching device 54 and controller 56 previously described, as long as their construction is such as to permit each valve 50a, 50b to be energized and de-energized independently of the other.

Oscillatory vertical movement occuring during operation of mount 10 between its sections 12, 14 causes oscillating pressure changes within mount chambers 18, 28 and oscillating fluid flow within at least the unvalved inertia track passageway 30 of the mount. At a particular excitation frequency f1 of the mount, the inertia forces generated by the oscillating fluid within passageway 30 effects an abrupt reduction in the dynamic stiffness of the mount. Assuming that valves 50 are then energized such that the electrorheological fluid within chambers 48 is in an activated solidified state, no significant fluid flow occurs within the passageways 36 underlying such valves. Upon de-energization of one of the valves 50, such as the valve 50a, the oscillating pressure within chamber 18 produces vertical oscillatory movement of the then flowable electrorheological fluid within chamber 48a. This in turn permits and/or produces oscillatory movement of the fluid within the underlying passageway 36a. The inertia forces then generated are therefore those produced by the fluid movement within both passageway 30 and passageway 36a. These are supplemented, but only to a relatively minor and probably insignificant extent, by the inertia forces generated by the contemporaneous oscillation of the electrorheological fluid within chamber 48a. As a result of the foregoing, an abrupt reduction in the dynamic stiffness of mount 10, similar to that previously occuring at a given frequency f1, now occurs at a different and higher frequency f2. When valve 50b is also de-energized the oscillatory movement of fluid within passageway 36b, as will as to a minor extent the fluid within chamber 48b, further contributes to the generated inertia forces. This results in another abrupt reduction in dynamic mount stiffness at another still higher frequency f3. If valve 48a were energized while valve 48b was de-energized, a similar reduction in dynamic stiffness would occur at a fourth excitation frequency intermediate frequencies f1 and f2. By appropriate energization and de-energization of valves 50, mount 10 may therefore be caused to experience abrupt reduction in stiffness at any or all of four different frequencies. By the addition of other passageways 36 and associated chambers 48 and valves 50, the number of tunable frequencies at which abrupt reductions in mount stiffness occur can be further increased.

While as shown in the drawings each valve 50 is located above its associated passageway 36, either or both valves may instead be located below its associated passageway. Such inversion of the illustrated components would not change the above-described operation of mount 10. Substantially the same operation would also ensue, if, as is indicated by phantom lines in FIG. 2, a diaphragm 60 were provided intermediate one of the passageways (illustratively passageway 36a) and lower chamber 28.

Each chamber 48 of mount 10 can and would be sized so as to prevent engagement between its valve 50 and diaphragms 44, 46. If so desired, however, the mount might be so designed as to result in engagement between the foregoing components when the electrorheological fluid is unactivated and the amplitude of the excitation forces upon the mount exceed a preselected magnitude. Diaphragms 44, 46 would then act as a so-called "decoupler" causing relatively large damping of excitations in excess of the preselected magnitude, but little or no damping of small amplitude excitations.

A mount in accordance with the present invention possesses the superior control capabilities derivable from the use of electrorheological fluid, while at the same time possessing nearly the inertia-force generating capabilities of mounts containing only conventional low-viscosity fluid. Since only a relatively small amount of its fluid is of the more expensive and frequently more chemically aggresive electrorheological type, and since only those mount components engaging the electrorheological fluid need be compatible with it, the present mount is also less costly than one filled entirely with such fluid.

While specific embodiments of the invention have been shown and described, this was for purposes of illustration only, and not for purposes of limitation, the scope of the invention being in accordance with the following claims.

That which is claimed is:

1. A vibration attenuating fluid mount or the like of the type adapted to generate inertia forces effecting abrupt changes in mount dynamic stiffness at certain excitation frequencies, comprising:
    housing means defining first, second and third variable volume fluid chambers, and further defining first and second passageways, said first and third chambers being contiguous, said first passageway extending between and communicating with said first and second chambers, said second passageway having one end contiguous with said first chamber and having another end contiguous with said third chamber;
    a first hydraulic fluid of an electrorheological type within said third chamber, a second hydraulic fluid of a nonelectrorheological type within said first and second chambers and at least said first passageway;
    electric field producing means for when energized producing a high voltage electric field within said third chamber;
    said third chamber being effective when said field producing means is de-energized to transmit pressure pulses between said first chamber and said second passageway, and said third chamber being substantially ineffective to transmit said pulses when said field producing means is energized.

2. A mount as in claim 1, wherein said electric field producing means includes a valve member having electrode elements disposed within said third chamber and extending in spaced and generally parallel relationship to each other, energization of said field producing means causing solidification of the part of said electrorheological fluid between said spaced electrode elements.

3. A mount as in claim 1, wherein said other end of said second passageway communicates with said third chamber.

4. A mount as in claim 1, wherein the length of each of said passageways is greater than the diameter thereof.

5. A mount as in claim 1, wherein the diameter of said first passageway is different from the diameter of said second passageway.

6. A mount as in claim 1, wherein at least one of said passageways is curved along the length direction thereof, and at least another of said passageways is substantially straight.

7. A mount as in claim 1, wherein the length of said first passageway is different from the length of said second passageway.

8. A mount as in claim 1, wherein said valve member has a cross-sectional flow area greater than the cross-sectional flow areas of said second passageway.

9. A mount as in claim 1, wherein said second passageway has a main section and a transition section intermediate said main section and said third chamber, said transition section being of varying cross-sectional area and having its greatest cross-sectional area adjacent said third chamber.

10. A mount as in claim 1, wherein said second fluid has a viscosity substantially less than the viscosity of said electrorheological fluid.

11. A mount as in claim 1, wherein said third chamber further acts as a decoupler to cause differential damping of excitations of differing amplitudes.

12. A mount as in claim 2, wherein said electrode elements have edge portions extending transversely to the direction of fluid flow through said valve member, said edge portions having curved surface portions reducing the flow resistance of said edge portions.

13. A mount as in claim 2, wherein said electrode elements include a plurality of substantially flat electrode plates defining at least three flow paths through said valve member.

14. A mount as in claim 2, wherein said electrode elements include at least two interdigitated electrodes of generally spiral shape, said electrodes extending in laterally spaced and generally parallel relationship to each other.

15. A vibration attenuating mount of the like type adapted to generate inertia forces effecting changes in the dynamic stiffness of the mount at certain excitation frequencies thereof, comprising:
    housing means defining first, second, third and fourth variable volume chambers, and further defining first, second and third elongate inertia track passageways, said first passageway extending between and communicating with said first and second chambers, said second and third passageways each having one end contiguous with one of said first and second chambers and another end contiguous with one of said third and fourth chambers, said third and fourth chambers each being contiguous with one of said first and third chambers;
    hydraulic fluid of a low viscosity non-electrorheological type within said first and second chambers and said passageways;
    electrorheological fluid within said third and fourth chambers for, when actuated by a high voltage electrical field, blocking the transmission of pressure pulses through said third and fourth chambers;

electric field producing means for when energized selectively producing a high voltage electric fields in said third and fourth chambers.

16. A mount as in claim 15, wherein said passageways differ in size from each other.

17. A mount as in claim 16, wherein at least two of said passageways have different diameters.

18. A mount as in claim 17, wherein at least two of said passageways have different lengths.

19. In a vibration attenuating fluid mount of the type adapted to generate inertia forces effecting abrupt reduction in the mount at certain excitation frequencies, said mount having first and second fluid chambers and an inertia track passageway containing low viscosity hydraulic fluid, the improvement comprising:

a third variable volume fluid chamber contiguous with one of said first and second chambers and with one end of said passageway, the other end of said passageway being contiguous with the other of said first and second chambers;

electrorheological fluid means within said third chamber for when actuated by a high voltage electrical field blocking the transmission of pressure pulses through said third chamber, and for when deactuated transmitting pressure pulses through said third chamber;

and means for at desired times producing a high voltage electrical field within said third chamber.

20. A mount as in claim 19, wherein said electrorheological fluid has a viscosity greater than that of said low viscosity hydraulic fluid, and wherein said other end of said passageway communicates with said other of said passageways.

* * * * *

UNITED STATES PATENT OFFICE
CERTIFICATE OF CORRECTION

PATENT NO. : 4,720,087

DATED : Jan. 19, 1988

INVENTOR(S) : Theodore G. Duclos; Douglas A. Hodgson; J. David Carlson

It is certified that error appears in the above-identified patent and that said Letters Patent are hereby corrected as shown below:

Column 5, Line 68, "58" should be --51--.

Column 6, Line 6, "58" should be --51--.

Column 6, Line 8, "58" should be --51--.

Signed and Sealed this

Twenty-third Day of August, 1988

Attest:

DONALD J. QUIGG

Attesting Officer

Commissioner of Patents and Trademarks